US009567024B2

(12) United States Patent
Laronde

(10) Patent No.: US 9,567,024 B2
(45) Date of Patent: Feb. 14, 2017

(54) KICKSTAND ASSEMBLY HAVING GEAR ASSEMBLY

(71) Applicant: Timothy Laronde, Edmonton (CA)

(72) Inventor: Timothy Laronde, Edmonton (CA)

( * ) Notice: Subject to any disclaimer, the term of this patent is extended or adjusted under 35 U.S.C. 154(b) by 0 days.

(21) Appl. No.: 14/696,563

(22) Filed: Apr. 27, 2015

(65) Prior Publication Data

US 2016/0311483 A1 Oct. 27, 2016

(51) Int. Cl.
*B62H 1/06* (2006.01)
*F16H 19/02* (2006.01)

(52) U.S. Cl.
CPC ................ *B62H 1/06* (2013.01); *F16H 19/02* (2013.01)

(58) Field of Classification Search
CPC .................................. B62H 1/06; F16H 19/02
USPC .................................................. 280/293, 304
See application file for complete search history.

(56) References Cited

U.S. PATENT DOCUMENTS

| | | | | |
|---|---|---|---|---|
| 2,292,633 | A | | 8/1942 | Griswold |
| 3,757,593 | A | | 9/1973 | Svenson |
| 3,857,377 | A | | 12/1974 | Christensen et al. |
| 4,123,952 | A | | 11/1978 | Wayman |
| 4,230,084 | A | | 10/1980 | Gotoh et al. |
| 4,497,221 | A | | 2/1985 | Koser |
| 4,603,754 | A | | 8/1986 | Matsutoh |
| 5,067,739 | A | * | 11/1991 | Kuan ...................... B62H 1/06 180/219 |
| 7,828,101 | B2 | | 11/2010 | Radtke et al. |
| 2003/0001356 | A1 | | 1/2003 | Carr et al. |
| 2005/0085329 | A1 | | 4/2005 | Kawakubo et al. |
| 2012/0083383 | A1 | | 4/2012 | Steuer et al. |
| 2014/0125032 | A1 | | 5/2014 | Haan |
| 2014/0225346 | A1 | | 8/2014 | Bettin |
| 2016/0052577 | A1 | * | 2/2016 | Lippman ................. B62H 1/12 280/304 |

FOREIGN PATENT DOCUMENTS

| | | |
|---|---|---|
| CN | 2680924 | 2/2005 |
| WO | 9967168 | 12/1999 |

* cited by examiner

*Primary Examiner* — Anne Marie Boehler
*Assistant Examiner* — Felicia L Brittman
(74) *Attorney, Agent, or Firm* — Giuseppe Mariconda

(57) ABSTRACT

An apparatus includes a kickstand assembly having a height-adjusting mechanism. A planetary gear assembly is operatively mounted to the height-adjusting mechanism of the kickstand assembly. The planetary gear assembly is configured to adjust the height-adjusting mechanism in such a way that a vertical height of the kickstand assembly is adjusted.

15 Claims, 5 Drawing Sheets

KICKSTAND ASSEMBLY HAVING GEAR ASSEMBLY

TECHNICAL FIELD

This document relates to the technical field of (and is not limited to) an apparatus for a wheeled vehicle in which the apparatus includes a kickstand assembly having a gear assembly.

BACKGROUND

A kickstand is a device on a bicycle or motorcycle (a vehicle) that is configured to allow the bike to be kept upright without leaning against another object or the aid of a person. The kickstand is usually a piece of metal that flips down from a vehicle frame of the vehicle (the bike), and makes contact with the ground. The kickstand is generally located in the middle of the bike or towards the rear of the bike. Some touring bikes have two instances of the kickstand: one instance at the rear and a second instance at the front.

SUMMARY

It will be appreciated that there exists a need to mitigate (at least in part) at least one problem associated with existing kickstands (also called existing technology). After much study of the known systems and methods with experimentation, an understanding of the problem and its solution has been identified and is articulated as follows:

To mitigate, at least in part, at least one problem associated with existing technology, there is provided (in accordance with a major aspect) an apparatus. The apparatus includes (and is not limited to) a kickstand assembly having a height-adjusting mechanism. A planetary gear assembly is operatively mounted to the height-adjusting mechanism of the kickstand assembly. The planetary gear assembly is configured to adjust the height-adjusting mechanism in such a way that a vertical height of the kickstand assembly is adjusted.

To mitigate, at least in part, at least one problem associated with existing technology, there is provided (in accordance with a major aspect) an apparatus. The apparatus includes (and is not limited to) a kickstand assembly having a height-adjusting mechanism. A gear assembly is operatively mounted to the height-adjusting mechanism of the kickstand assembly. The gear assembly includes an input device configured to receive a height-adjustment force. An intermediate device is configured to be coupled to the input device. The intermediate device is configured to receive (at least in part) the height-adjustment force that was received (at least in part) by the input device. An output device is coupled to the intermediate device. The output device is also coupled to the height-adjusting mechanism of the kickstand assembly. The output device is configured to receive (at least in part) the height-adjustment force received, at least in part, by the intermediate device. The output device is also configured to transmit, at least in part, the height-adjustment force that was received from the intermediate device to the height-adjusting mechanism of the kickstand assembly in such a way that the height-adjusting mechanism adjusts the vertical height of the kickstand assembly.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1A:
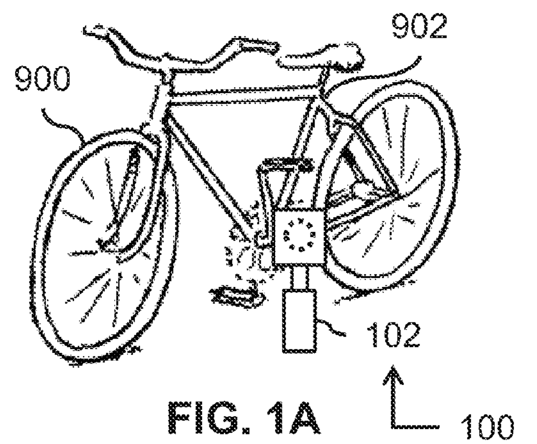
FIG. 1A, FIG. 1B, FIG. 1C and FIG. 1D (SHEET 1 of 5 SHEETS) depict views of embodiments of an apparatus for a wheeled vehicle having a vehicle frame, in which the apparatus includes a kickstand assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100 apparatus
102 kickstand assembly
104 height-adjusting mechanism
108 gear assembly
112 housing assembly
114 input device
116 intermediate device
118 output device
120 planetary gear assembly
122 ring gear
124 sun gear
125 sun shaft
126 planet gear
128 planet carrier
129 carrier-extension member
130 mounting device
132 transferring device
134 transferring input gear
136 transferring output gear
138 first threaded shaft member
140 second threaded shaft member
142 stationary housing
144 rotatable housing
900 wheeled vehicle

902 vehicle frame
904 height-adjustment force

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 1B:
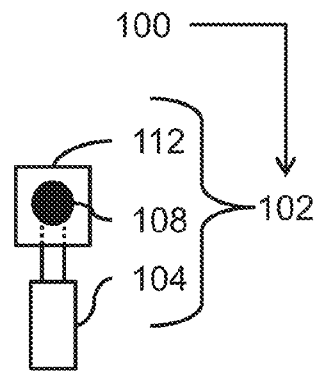
Figure 1D:
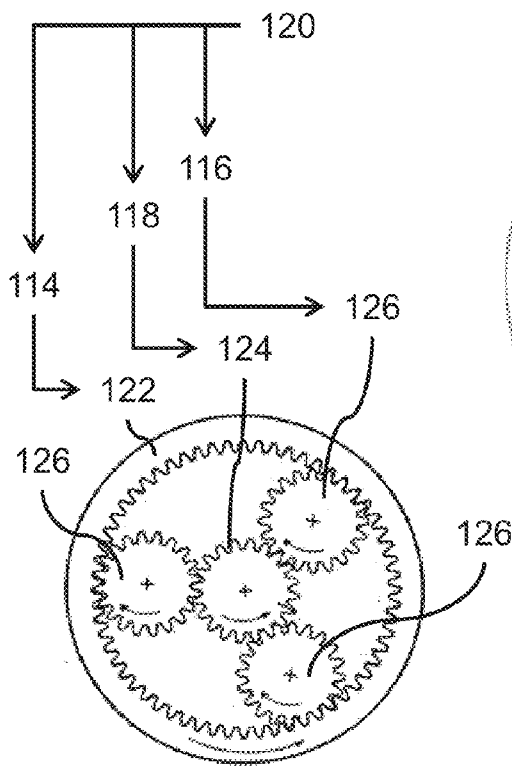
Figure 1C:
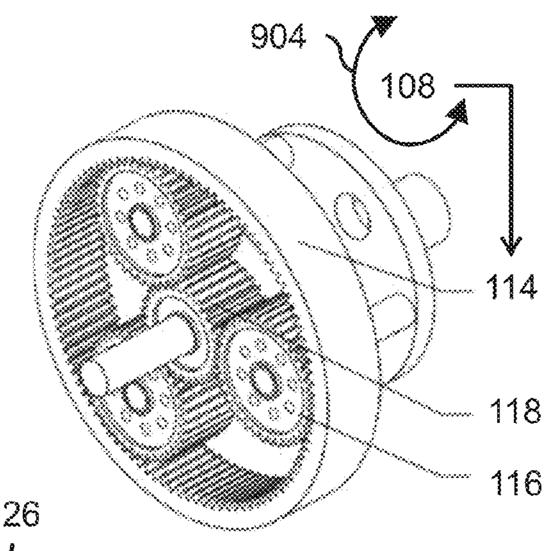

FIG. 1A, FIG. 1B, FIG. 1C and FIG. 1D depict views of embodiments of an apparatus 100 for a wheeled vehicle 900 having a vehicle frame 902, in which the apparatus 100 includes a kickstand assembly 102. FIG. 1A and FIG. 1C depict perspective views of embodiments of the apparatus 100. FIG. 1B depicts a schematic view of an embodiment of the apparatus 100 depicted in FIG. 1C. FIG. 1D depicts a front view of the embodiments of the apparatus 100 depicted in FIG. 1C.

The wheeled vehicle 900 may include any type of a vehicle, or any type of a two-wheeled vehicle, such as a bicycle, a motorbike, and any equivalent thereof. It will be appreciated that the apparatus 100 does not include the wheeled vehicle 900 having the vehicle frame 902 (unless stated otherwise, for instance in the claims).

In accordance with a first major embodiment (as depicted in FIG. 1A, FIG. 1B, FIG. 1C and FIG. 1D), the apparatus 100 includes (and is not limited to) a synergistic combination of a kickstand assembly 102 and a planetary gear assembly 120. The kickstand assembly 102 has a height-adjusting mechanism 104. The planetary gear assembly 120 is operatively mounted (either directly or indirectly) to the height-adjusting mechanism 104 of the kickstand assembly 102. The planetary gear assembly 120 is configured to adjust (either directly or indirectly) the height-adjusting mechanism 104 in such a way that a vertical height of the kickstand assembly 102 is adjusted (vertical height adjusted).

In accordance with a second major embodiment (as depicted in FIG. 1A, FIG. 1B, FIG. 1C and FIG. 1D), the apparatus 100 includes (and is not limited to) a synergistic combination of the kickstand assembly 102 and a gear assembly 108. The kickstand assembly 102 has (includes) the height-adjusting mechanism 104. The gear assembly 108 is operatively mounted (either directly or indirectly) to the height-adjusting mechanism 104 of the kickstand assembly 102. The gear assembly 108 includes an input device 114 configured to receive (either directly or indirectly) a height-adjustment force 904. An intermediate device 116 is configured to be coupled (either directly or indirectly) to the input device 114. The intermediate device 116 is configured to receive (at least in part, and either directly or indirectly), the height-adjustment force 904 that was received (at least in part, and either directly or indirectly) by the input device 114. An output device 118 is coupled (either directly or indirectly) to the intermediate device 116. The output device 118 is also coupled (either directly or indirectly) to the height-adjusting mechanism 104 of the kickstand assembly 102. The output device 118 is configured to receive (at least in part, and either directly or indirectly) the height-adjustment force 904 that was received (at least in part, and either directly or indirectly) by the intermediate device 116. The output device 118 is also configured to transmit (at least in part, and either directly or indirectly) the height-adjustment force 904 that was received (at least in part, and either directly or indirectly) from the intermediate device 116 to the height-adjusting mechanism 104 of the kickstand assembly 102. This is done in such a way that the height-adjusting mechanism 104 adjusts (ad least in part) the vertical height of the kickstand assembly 102.

In accordance with a third major embodiment (as depicted in FIG. 1A, FIG. 1B, FIG. 1C and FIG. 1D), the apparatus 100 includes (and is not limited to) a synergistic combination of the kickstand assembly 102 and the gear assembly 108.

The kickstand assembly 102 is configured to be operatively mountable (either directly or indirectly) to the vehicle frame 902 of the wheeled vehicle 900. The kickstand assembly 102 has (includes) a height-adjusting mechanism 104. The height-adjusting mechanism 104 is configured to adjust (either directly or indirectly) a vertical height of the vehicle frame 902 of the wheeled vehicle 900 (that is, once the kickstand assembly 102 that is operatively mounted to the vehicle frame 902 and the height-adjusting mechanism 104 is operated to do just so).

The gear assembly 108 is operatively mounted (either directly or indirectly) to the height-adjusting mechanism 104 of the kickstand assembly 102. The gear assembly 108 includes (and is not limited to) a synergistic combination of a housing assembly 112, an input device 114, an intermediate device 116, and an output device 118.

The housing assembly 112 is configured to be mounted (either directly or indirectly) to the vehicle frame 902 of the wheeled vehicle 900.

The input device 114 is mounted (either directly or indirectly) in the housing assembly 112. The input device 114 is configured to receive (either directly or indirectly) a height-adjustment force 904.

The intermediate device 116 is mounted (either directly or indirectly) in the housing assembly 112. The intermediate device 116 is configured to be coupled (either directly or indirectly) to the input device 114. The intermediate device 116 is configured to receive (at least in part, and either directly or indirectly) the height-adjustment force 904 that was received, at least in part, by the input device 114.

The output device 118 is mounted (either directly or indirectly) in the housing assembly 112. The output device

118 is coupled (either directly or indirectly) to the intermediate device 116. The output device 118 is coupled (either directly or indirectly) to the height-adjusting mechanism 104 of the kickstand assembly 102. The output device 118 is configured to receive (at least in part, and either directly or indirectly) the height-adjustment force 904 that was received, at least in part, by the intermediate device 116.

The output device 118 is also configured to transmit (at least in part, and either directly or indirectly) the height-adjustment force 904 that was received from the intermediate device 116 to the height-adjusting mechanism 104 of the kickstand assembly 102. This is done in such a way that the height-adjusting mechanism 104 adjusts (either directly or indirectly) the vertical height of the kickstand assembly 102. In response to height adjustment of the kickstand assembly 102, the vehicle frame 902 of the wheeled vehicle 900, which is mounted to the kickstand assembly 102, is height adjusted.

In accordance with a preferred embodiment as depicted in FIG. 1C, the input device 114, the intermediate device 116 and the output device 118 are configured to be movable relative to each other.

In accordance with a preferred embodiment (as depicted in FIG. 1D), the gear assembly 108 includes (and is not limited to) a planetary gear assembly 120. The planetary gear assembly 120 includes a synergistic combination of a ring gear 122, a sun gear 124 coupled to the ring gear 122, and a planet gear 126 coupled to the ring gear 122. The ring gear 122, the sun gear 124 and the planet gear 126 are configured to be movable relative to each other. The planetary gear assembly 120 also includes a planet carrier 128 (not depicted in FIG. 1D but is depicted in the remaining FIGS.). The planet carrier 128 operatively supports the ring gear 122, the sun gear 124 and the planet gear 126.

In accordance with the embodiment as depicted in FIG. 1D, the gear assembly 108 includes the planetary gear assembly 120 (depicted in FIG. 1D) having the ring gear 122, the planet gear 126 and the sun gear 124. The input device 114 includes the ring gear 122. The intermediate device 116 includes the planet gear 126. The output device 118 includes the sun gear 124. Generally, the planetary gear assembly 120 includes a combination of the ring gear 122, the sun gear 124, the planet gear 126 and the planet carrier 128. The planet carrier 128 is configured to position the ring gear 122, the sun gear 124 and the planet gear 126 relative to each other.

In summary (in general terms), the apparatus 100 includes a telescopic kickstand having a planetary gear assembly 120 configured to telescopically move the telescopic kickstand. The planetary gear assembly 120 is configured to allow up movement and down movement of the telescopic kickstand through the transfer of forces via the gear assembly 108. It will be appreciated that there are many arrangements (embodiments) for the gear assembly 108, of which several are further described below.

In accordance with a preferred embodiment, the gear assembly 108 includes an epicyclical gear train (also called a planetary gear system) that includes the sun gear 124 and the planet gear 126 (one or more instances of the planet gear 126) mounted in such a way that the center of the planet gear 126 revolves around the center of the sun gear 124. The planet carrier 128 connects the centers of the planet gear 126 and the sun gear 124. The planet carrier 128 is configured to carry, in use, the planet gear 126 around the sun gear 124. The planet gear 126 and the sun gear 124 mesh so that their pitch circles roll without slip. A point on the pitch circle of the planet gear 126 traces an epicycloid curve. In this simplified case, the sun gear 124 may be fixed and the planetary gear(s) 126 roll around the sun gear 124. The epicyclical gear train may be assembled so the planet gear 126 rolls on the inside of the pitch circle of the ring gear 122 (also called an annular gear). In this case, the curve traced by a point on the pitch circle of the planet gear 126 is a hypocycloid. The combination of epicycle gear trains with the planet gear 126 engaging both the sun gear 124 and the ring gear 122 is called a planetary gear train. The ring gear 122 may be fixed (in position) and the sun gear 124 may be driven (and other options or arrangements are possible). A planetary gear system (also referred to as an epicyclical gearing system) includes the sun gear 124, the planet gear 126 and the ring gear 122. The sun gear 124 is located at the center, and is configured to transmit torque to the planet gear(s) 126 orbiting around the sun gear 124. The sun gear 124 and the planet gear 126 are located inside the ring gear 122. The sun gear 124 and the planet gear(s) 126 externally mesh, and the ring gear 122 internally meshes.

FIG. 2A, FIG. 2B, FIG. 2C, FIG. 2D and FIG. 2E depict side views of the embodiments of the apparatus 100 of FIG. 1B.

In accordance with the embodiments depicted in FIG. 2A, FIG. 2B, FIG. 2C, FIG. 2D and FIG. 2E, the planetary gear assembly 120 is arranged in such a way that the planet carrier 128 is configured to be affixed (selectively attached and detached) to the vehicle frame 902 (such as, to an axle portion of the vehicle frame 902, etc.). For instance, the planet carrier 128 includes a mounting device 130 configured to directly connect the planet carrier 128 to the vehicle frame 902. In this arrangement, the planet carrier 128 is held stationary (in a relatively stationary position) relative to the vehicle frame 902.

Figure 2A:
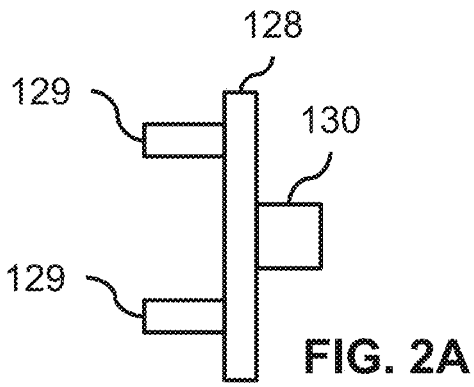
FIG. 2A, FIG. 2B, FIG. 2C, FIG. 2D and FIG. 2E (SHEETS 2 to 4 of 5 SHEETS) depict views of embodiments of the apparatus of FIG. 1B.

Referring to FIG. 2A, the planet carrier 128 includes a carrier-extension member 129, also called a shaft, that extends from the carrier-extension member 129. The carrier-extension member 129 is configured to extend away from the vehicle frame 902 once the planet carrier 128 is mounted (either directly or indirectly) to the vehicle frame 902.

Figure 2B:
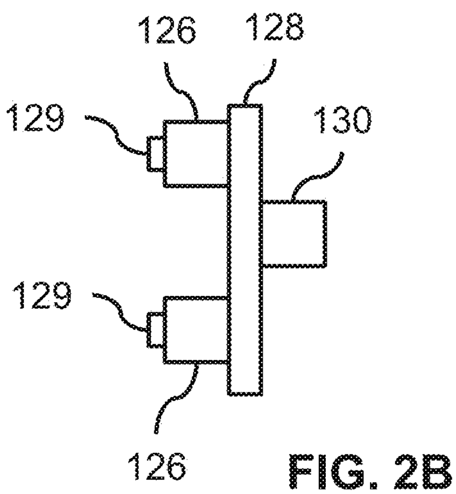

Referring to FIG. 2B, the carrier-extension member 129 is configured to receive the planet gear 126. The number of instances of the planet gear 126 may vary as needed. As depicted in FIG. 1D, there are three instances of the planet gear 126 (evenly spaced apart from each other at 120 degree). As depicted in FIGS. 2A to 2E, there are two instances of the planet gear 126 each spaced 180 degrees apart from each other.

Figure 2C:
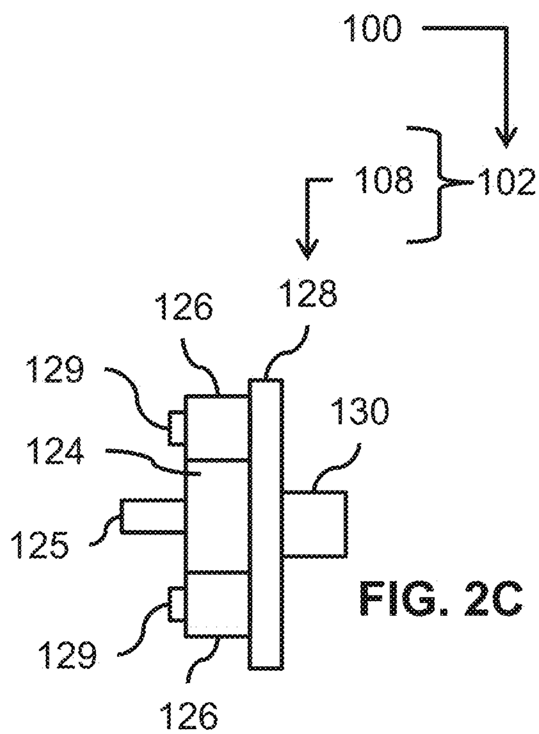

Referring to FIG. 2C, the sun gear 124 is operatively mounted to the instances of the planet gear 126 (between the planet gears 126) in such a way that the teeth of the sun gear 124 operatively mesh (interact) with the teeth of the planet gears 126. The sun gear 124 has a sun shaft 125 that extends from the sun gear 124 away from the vehicle frame 902 (once the sun gear 124 is mounted to the planet gears 126, and the planet carrier 128 is mounted to the vehicle frame 902).

Figure 2D:
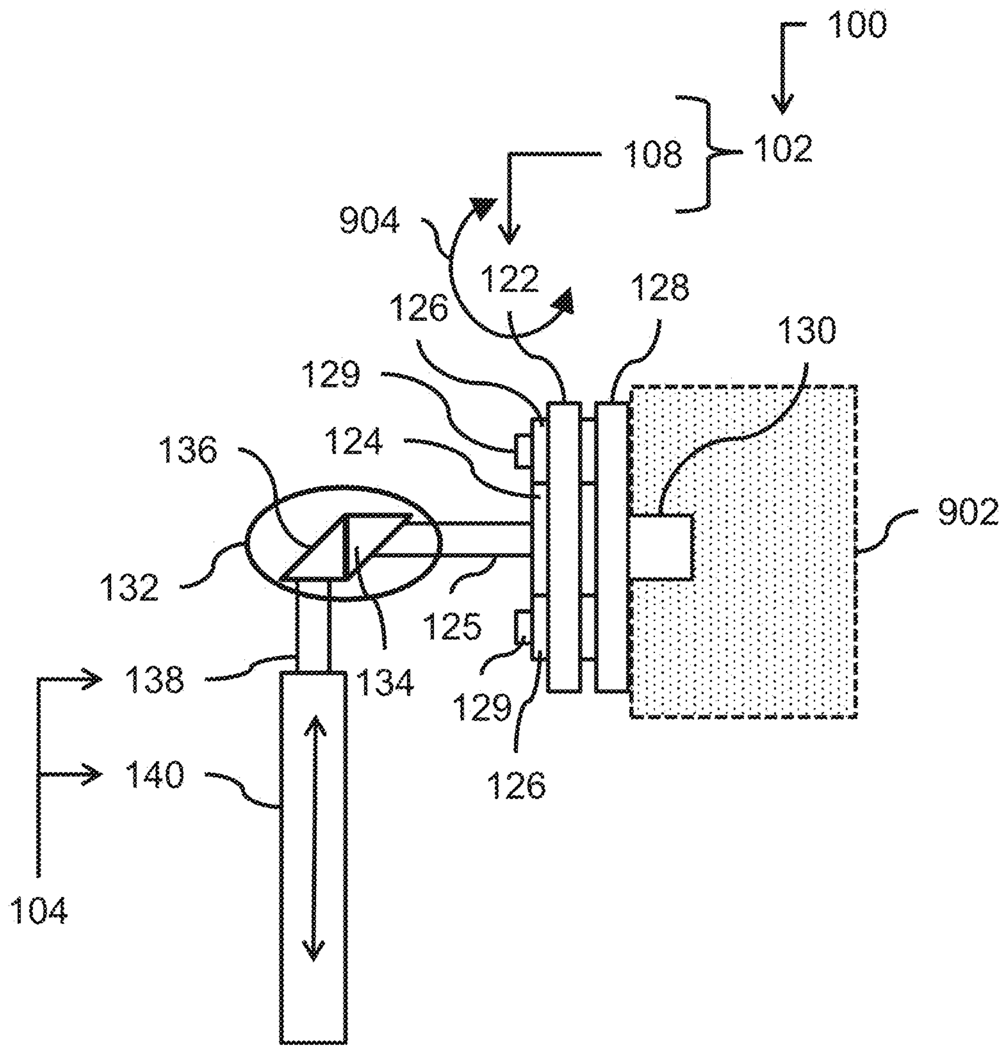

Referring to FIG. 2D, the ring gear 122 is operatively mounted to the planet gears 126 in such a way that the teeth of the ring gear 122 mesh with the teeth of the planet gears 126.

A transferring device 132 includes a transferring input gear 134 and a transferring output gear 136. The transferring output gear 136 is configured to operatively mesh (interact) with the transferring input gear 134.

The transferring device 132 is operatively connected (mounted) to the sun shaft 125 of the sun gear 124 in such a way that the sun shaft 125 turns (rotates) the transferring input gear 134, and, in response, the transferring input gear 134 rotates the transferring output gear 136. The transferring device 132 is coupled to the height-adjusting mechanism 104.

The height-adjusting mechanism 104 includes a first threaded shaft member 138 and a second threaded shaft member 140. The first threaded shaft member 138 is threadably coupled to the second threaded shaft member 140. The transferring device 132 is coupled to the first threaded shaft member 138.

Referring to FIG. 2D, in use (in operation), the ring gear 122 is rotated (for instance, manually by the user). This is done in such a way that the sun shaft 125 is rotated. In response to rotation of the sun shaft 125, the transferring device 132 is activated to rotate the first threaded shaft member 138. Once the first threaded shaft member 138 is rotated, the second threaded shaft member 140 is rotated relative to the first threaded shaft member 138. In this way, the second threaded shaft member 140 is linearly translated (up and down) along a substantially vertical direction.

Figure 2E:
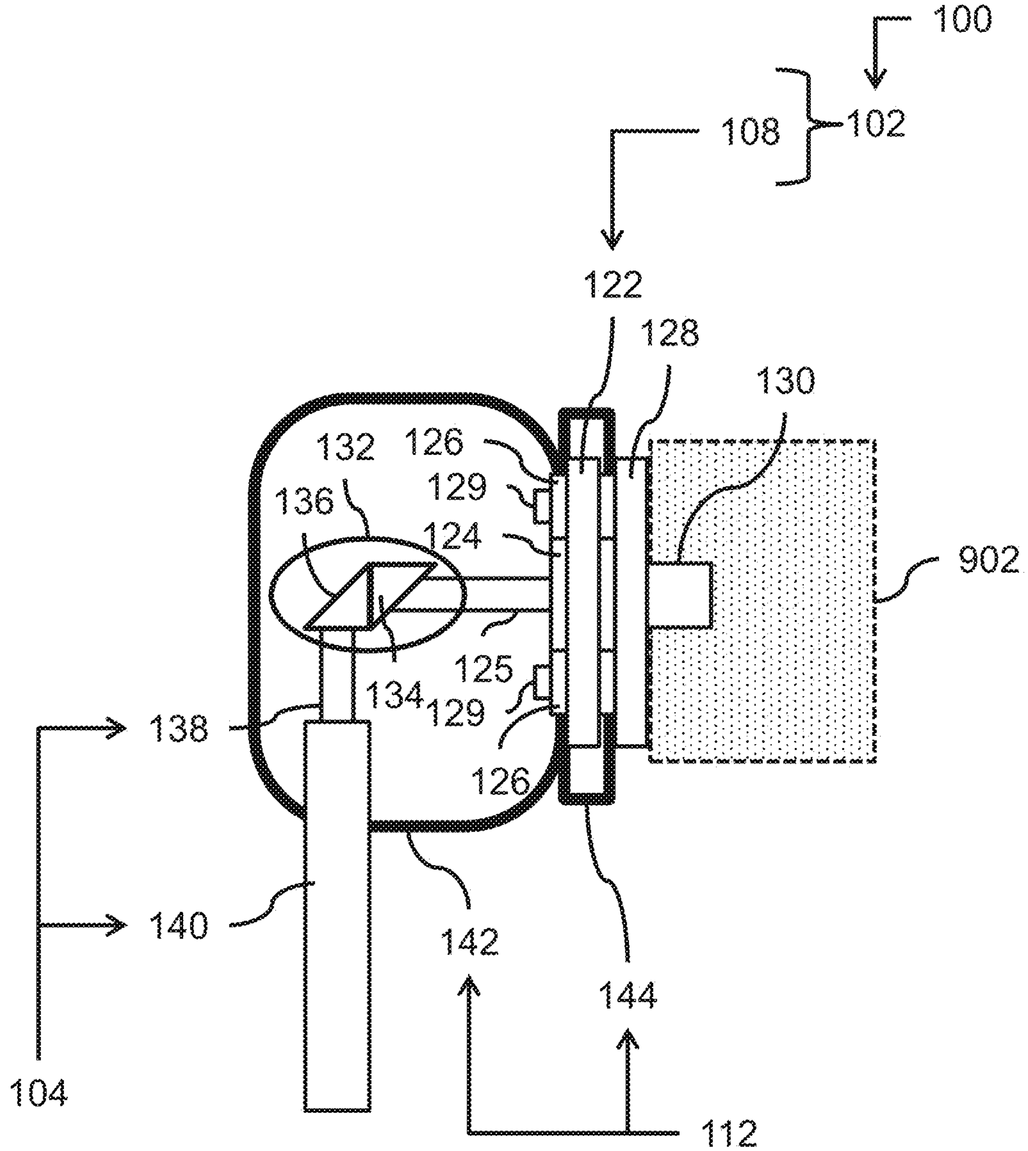

Referring to FIG. 2E, the housing assembly 112 includes a stationary housing 142 and a rotatable housing 144. The rotatable housing 144 is configured to be rotatable relative to the stationary housing 142.

The ring gear 122 is operatively mounted in the rotatable housing 144. The rotatable housing 144 is rotated in such a way that the ring gear 122 is rotated.

In summary, the planet carrier 128 is affixed to the vehicle frame 902. The ring gear 122 is rotatable (for instance, by the user) once the ring gear 122 receives the height-adjustment force 904. This action then urges the sun shaft 125 to be rotated, which then causes the height-adjusting mechanism 104 to become linearly height adjusted. It will be appreciated that rotating the ring gear 122 in one direction (such as clockwise) causes the height-adjusting mechanism 104 to become vertically shorter. It will be appreciated that rotating the ring gear 122 in another direction (such as counterclockwise) causes the height-adjusting mechanism 104 to become vertically longer in height.

Figure 3:
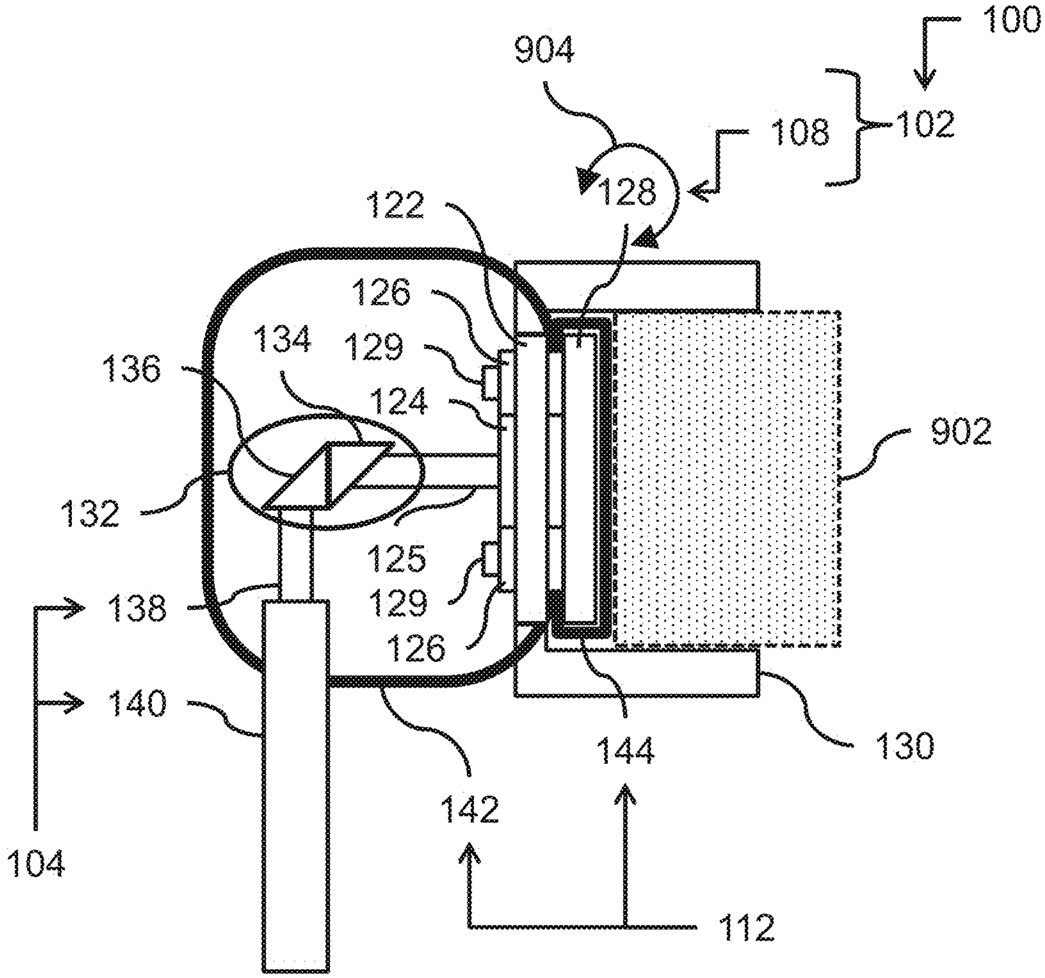
FIG. 3 (SHEET 5 of 5 SHEETS) depicts a side view of an embodiment of the apparatus of FIG. 1B.

FIG. 3 depicts a side view of an embodiment of the apparatus 100 of FIG. 1B.

Referring to the embodiment as depicted in FIG. 3, the ring gear 122 is affixed (in a stationary position) to the vehicle frame 902. For instance, the mounting device 130 extends (radially) from the ring gear 122 toward the vehicle frame 902, and the mounting device 130 affixes the ring gear 122 to the vehicle frame 902.

The planet carrier 128 is rotatable (for instance, by the user) once the planet carrier 128 receives the height-adjustment force 904. This action urges the sun shaft 125 (in response) to be rotated, which then causes the height-adjusting mechanism 104 to become linearly height adjusted.

It will be appreciated that rotating the planet carrier 128 in one direction (such as clockwise) causes the height-adjusting mechanism 104 to become vertically shorter.

It will be appreciated that rotating the planet carrier 128 in another direction (such as counterclockwise) causes the height-adjusting mechanism 104 to become vertically longer in height.

In accordance with an embodiment, the transferring device 132 may include a crown and pinion gear (by way of example).

In accordance with an embodiment, the height-adjusting mechanism 104 includes a pulley that is operatively mounted to the sun gear 124. The height-adjusting mechanism 104 also includes a cable that is operatively mounted to a telescopic tubing device having a tube guide. The tube guide is configured to prevent twisting (rotation) of the telescopic tubing.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
a kickstand assembly having a height-adjusting mechanism; and
a planetary gear assembly being operatively mounted to the height-adjusting mechanism of the kickstand assembly, and the planetary gear assembly being configured to adjust the height-adjusting mechanism in such a way that a vertical height of the kickstand assembly is adjusted; and
the planetary gear assembly including a ring gear, a sun gear, a planet gear and a planet carrier;
the planet carrier being configured to position the ring gear, the sun gear and the planet gear relative to each other; and
the planet carrier being configured to receive the planet gear;
the ring gear being operatively mounted to the planet gear;
the sun gear being operatively mounted to the planet gear;
the sun gear having a sun shaft extending from the sun gear; and
a transferring device includes:
a transferring input gear being coupled to the height-adjusting mechanism; and
a transferring output gear that operatively meshes with the transferring input gear; and the transferring device being operatively connected to the sun shaft of the sun gear in such a way that the sun shaft rotates the transferring input gear, and, in response, the transferring input gear rotates the transferring output gear.

2. The apparatus of claim 1, wherein:
the height-adjusting mechanism includes:
a first threaded shaft member; and
a second threaded shaft member; and
the first threaded shaft member is threadably coupled to the second threaded shaft member;
the transferring device is coupled to the first threaded shaft member;
in operation, the ring gear is rotated in such a way that the sun shaft is rotated;
in response to rotation of the sun shaft, the transferring device is activated to rotate the first threaded shaft member; and
once the first threaded shaft member is rotated, the second threaded shaft member is rotated relative to the first threaded shaft member, and, in this way, the second threaded shaft member is linearly translated along a substantially vertical direction.

3. The apparatus of claim 1, further comprising:
a housing assembly that comprises:
a stationary housing; and
a rotatable housing that is rotatable relative to the stationary housing.

4. The apparatus of claim 3, wherein:
the planet carrier is configured to position the ring gear, the sun gear and the planet gear relative to each other;
the ring gear is mounted in the rotatable housing;
the rotatable housing is rotated in such a way that the ring gear is rotated; and
the ring gear is rotatable once the ring gear receives a height-adjustment force and this action urges the sun shaft to be rotated, which then causes the height-adjusting mechanism to become linearly height adjusted.

5. The apparatus of claim 3, wherein:
the planet carrier is configured to position the ring gear, the sun gear and the planet gear relative to each other;
the ring gear is in a stationary position;
a mounting device extends from the ring gear; and
the planet carrier is rotatable once the planet carrier receives a height-adjustment force, and this action urges the sun shaft to be rotated in response, which then causes the height-adjusting mechanism to become linearly height adjusted.

6. An apparatus for a wheeled vehicle having a vehicle frame, the apparatus comprising:
a kickstand assembly having a height-adjusting mechanism; and
a gear assembly being operatively mounted to the height-adjusting mechanism of the kickstand assembly, and the gear assembly including:
an input device configured to receive a height-adjustment force;
an intermediate device being configured to be coupled to the input device, and to receive, at least in part, the height-adjustment force received, at least in part, by the input device; and
an output device being coupled to the intermediate device and also being coupled to the height-adjusting mechanism of the kickstand assembly, and the output device being configured to:
receive, at least in part, the height-adjustment force received, at least in part, by the intermediate device; and
transmit, at least in part, the height-adjustment force that was received from the intermediate device to the height-adjusting mechanism of the kickstand assembly in such a way that the height-adjusting mechanism adjusts a vertical height of the kickstand assembly; and
wherein:
the gear assembly includes:
a planetary gear assembly, including:
a ring gear;
a sun gear coupled to the ring gear;
a planet gear coupled to the ring gear; and
a planet carrier operatively supporting the ring gear, the sun gear and the planet gear; and
the ring gear, the sun gear and the planet gear are configured to be movable relative to each other;
the input device includes the ring gear;
the intermediate device includes the planet gear; and
the output device includes the sun gear; and
the planet carrier is configured to be affixed to the vehicle frame in such a way that the planet carrier is held stationary relative to the vehicle frame;
the planet carrier includes a carrier-extension member that extends away from the vehicle frame once the planet carrier is mounted to the vehicle frame, and the carrier-extension member is configured to receive the planet gear;
the ring gear is operatively mounted to the planet gear;
the sun gear is operatively mounted to the planet gear; and
the sun gear has a sun shaft that extends from the sun gear away from the vehicle frame once the sun gear is mounted to the planet gear, and the planet carrier is mounted to the vehicle frame; and
a transferring device includes:
a transferring input gear coupled to the height-adjusting mechanism; and
a transferring output gear that operatively meshes with the transferring input gear; and
the transferring device is operatively connected to the sun shaft of the sun gear in such a way that the sun shaft rotates the transferring input gear, and, in response, the transferring input gear rotates the transferring output gear.

7. The apparatus of claim 6, further comprising:
a housing assembly that comprises:
a stationary housing; and
a rotatable housing that is rotatable relative to the stationary housing.

8. The apparatus of claim 7, wherein:
the ring gear is mounted in the rotatable housing;
the rotatable housing is rotated in such a way that the ring gear is rotated;
the planet carrier is affixed to the vehicle frame; and
the ring gear is rotatable once the ring gear receives the height-adjustment force and this action urges the sun shaft to be rotated, which then causes the height-adjusting mechanism to become linearly height adjusted.

9. The apparatus of claim 7, wherein:
the ring gear is affixed to the vehicle frame;
a mounting device extends from the ring gear toward the vehicle frame;

the mounting device affixes the ring gear to the vehicle frame; and the planet carrier is rotatable once the planet carrier receives the height-adjustment force, and this action urges the sun shaft to be rotated in response, which then causes the height-adjusting mechanism to become linearly height adjusted.

10. The apparatus of claim 6, wherein:

the height-adjusting mechanism includes:

a first threaded shaft member;

a second threaded shaft member; and the first threaded shaft member is threadably coupled to the second threaded shaft member; and the transferring device is coupled to the first threaded shaft member;

in operation, the ring gear is rotated in such a way that the sun shaft is rotated;

in response to rotation of the sun shaft, the transferring device is activated to rotate the first threaded shaft member; and once the first threaded shaft member is rotated, the second threaded shaft member is rotated relative to the first threaded shaft member, and, in this way, the second threaded shaft member is linearly translated along a substantially vertical direction.

11. An apparatus for a wheeled vehicle having a vehicle frame, the apparatus comprising:

a kickstand assembly being configured to be operatively mountable to the vehicle frame of the wheeled vehicle, and the kickstand assembly having a height-adjusting mechanism being configured to adjust a vertical height of the vehicle frame of the wheeled vehicle once the kickstand assembly is operatively mounted to the vehicle frame and the height-adjusting mechanism is operated; and a gear assembly being operatively mounted to the height-adjusting mechanism of the kickstand assembly, and the gear assembly including:

a housing assembly being configured to be mounted to the vehicle frame of the wheeled vehicle;

an input device being mounted in the housing assembly, and the input device being configured to receive a height-adjustment force;

an intermediate device being mounted in the housing assembly, and the intermediate device being configured to be coupled to the input device, and to receive, at least in part, the height-adjustment force received, at least in part, by the input device; and an output device being mounted in the housing assembly, and the output device being coupled to the intermediate device and also being coupled to the height-adjusting mechanism of the kickstand assembly, and the output device being configured to:

receive, at least in part, the height-adjustment force received, at least in part, by the intermediate device; and transmit, at least in part, the height-adjustment force that was received from the intermediate device to the height-adjusting mechanism of the kickstand assembly in such a way that the height-adjusting mechanism adjusts the vertical height of the kickstand assembly and in response to height adjustment of the kickstand assembly, the vehicle frame of the wheeled vehicle, which is mounted to the kickstand assembly, is height adjusted; and wherein:

the input device, the intermediate device and the output device are configured to be movable relative to each other; and the gear assembly includes:

a planetary gear assembly including:

a ring gear;

a sun gear coupled to the ring clear;

a planet gear coupled to the ring gear; and a planet carrier operatively supporting the ring gear, the sun gear and the planet gear; and the ring gear, the sun gear and the planet gear are configured to be movable relative to each other; and a transferring device includes:

a transferring input gear coupled to the height-adjusting mechanism; and a transferring output gear that operatively meshes with the transferring input gear; and the transferring device operatively connected to a sun shaft of the sun gear in such a way that the sun shaft rotates the transferring input gear, and, in response, the transferring input gear rotates the transferring output gear.

12. The apparatus of claim 11, wherein:

the height-adjusting mechanism includes:

a first threaded shaft member; and a second threaded shaft member; and the first threaded shaft member is threadably coupled to the second threaded shaft member;

the transferring device is coupled to the first threaded shaft member;

in operation, the ring gear is rotated in such a way that the sun shaft is rotated;

in response to rotation of the sun shaft, the transferring device is activated to rotate the first threaded shaft member; and once the first threaded shaft member is rotated, the second threaded shaft member is rotated relative to the first threaded shaft member, and, in this way, the second threaded shaft member is linearly translated along a substantially vertical direction.

13. The apparatus of claim 11, wherein:

the housing assembly includes:

a stationary housing; and a rotatable housing that is rotatable relative to the stationary housing.

14. The apparatus of claim 13, wherein:

the planet carrier is configured to position the ring gear, the sun gear and the planet gear relative to each other;

the ring gear is mounted in the rotatable housing;

the rotatable housing is rotated in such a way that the ring gear is rotated; and the ring gear is rotatable once the ring gear receives the height-adjustment force and this action urges the sun shaft to be rotated, which then causes the height-adjusting mechanism to become linearly height adjusted.

15. The apparatus of claim 13, wherein:

the planet carrier is configured to position the ring gear, the sun gear and the planet gear relative to each other;

the ring gear is in a stationary position;

a mounting device extends from the ring gear; and the planet carrier is rotatable once the planet carrier receives the height-adjustment force, and this action urges the sun shaft to be rotated in response, which then causes the height-adjusting mechanism to become linearly height adjusted.

* * * * *